(12) United States Patent
Ishii et al.

(10) Patent No.: US 11,780,526 B2
(45) Date of Patent: Oct. 10, 2023

(54) SADDLE-RIDING TYPE VEHICLE

(71) Applicant: KAWASAKI JUKOGYO KABUSHIKI KAISHA, Hyogo (JP)

(72) Inventors: Hiroshi Ishii, Kobe (JP); Kohei Akita, Akashi (JP); Teruaki Mizukawa, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 222 days.

(21) Appl. No.: 16/670,182

(22) Filed: Oct. 31, 2019

(65) Prior Publication Data

US 2020/0140030 A1 May 7, 2020

(30) Foreign Application Priority Data

Nov. 2, 2018 (JP) ................. 2018-207565

(51) Int. Cl.
| | |
|---|---|
| *B62J 35/00* | (2006.01) |
| *F02M 25/08* | (2006.01) |
| *B62J 37/00* | (2006.01) |
| *B62H 1/00* | (2006.01) |
| *B60K 15/035* | (2006.01) |
| *B62K 19/32* | (2006.01) |

(52) U.S. Cl.
CPC ............. *B62J 35/00* (2013.01); *B62J 37/00* (2013.01); *F02M 25/089* (2013.01); *F02M 25/0836* (2013.01); *F02M 25/0854* (2013.01); *B60K 15/035* (2013.01); *B60K 2015/03514* (2013.01); *B62H 1/00* (2013.01); *B62K 19/32* (2013.01); *F02M 2025/0863* (2013.01)

(58) Field of Classification Search
CPC ....... B62J 35/00; B62J 37/00; F02M 25/0854; F02M 25/0836; F02M 25/089; F02M 2025/0863; B62H 1/00; B60K 2015/03514; B60K 15/035; B60K 2015/0637; B62K 19/32; B62K 11/04
See application file for complete search history.

(56) References Cited

U.S. PATENT DOCUMENTS

| 7,581,615 B2 | 9/2009 | Karube et al. |
|---|---|---|
| 8,418,794 B2 | 4/2013 | Shibata et al. |
| 2007/0023218 A1 | 2/2007 | Koike et al. |

(Continued)

FOREIGN PATENT DOCUMENTS

| ES | 2 381 925 | 7/2010 |
|---|---|---|
| JP | 2007-15468 | 1/2007 |

(Continued)

*Primary Examiner* — Kurt Philip Liethen
(74) *Attorney, Agent, or Firm* — Wenderoth, Lind & Ponack, L.L.P.

(57) ABSTRACT

A saddle-riding type vehicle includes a driver's seat on which an occupant taking a driving posture sits, a fuel tank disposed in front of the driver's seat and extending in a front-rear direction and a canister formed into a long-length shape that defines a longitudinal direction of the canister, fuel vapors generated in the fuel tank being brought into the canister and adsorbed and held by an adsorbent provided in the canister. The canister is disposed under the fuel tank with the longitudinal direction aligned with the front-rear direction and is entirely covered by the fuel tank in vehicle side view.

16 Claims, 7 Drawing Sheets

(56) References Cited

U.S. PATENT DOCUMENTS

| | | | | |
|---|---|---|---|---|
| 2009/0025822 | A1* | 1/2009 | Rittershofer | B60K 15/03519 |
| | | | | 141/285 |
| 2010/0163328 | A1 | 7/2010 | Hasegawa | |
| 2010/0243358 | A1* | 9/2010 | Suzuki | F02M 25/0854 |
| | | | | 180/219 |
| 2011/0100742 | A1* | 5/2011 | Shibata | F02M 25/0854 |
| | | | | 180/219 |
| 2011/0308874 | A1* | 12/2011 | Tanaka | B62K 11/04 |
| | | | | 180/219 |
| 2012/0199408 | A1* | 8/2012 | Hayashi | B62J 35/00 |
| | | | | 180/219 |
| 2012/0240905 | A1* | 9/2012 | Kondo | B62J 37/00 |
| | | | | 123/519 |
| 2014/0060955 | A1* | 3/2014 | Kono | F02M 35/024 |
| | | | | 180/291 |
| 2014/0116794 | A1* | 5/2014 | Kawai | B62K 11/04 |
| | | | | 180/68.1 |
| 2015/0158540 | A1* | 6/2015 | Hara | B62J 37/00 |
| | | | | 180/219 |
| 2016/0009329 | A1* | 1/2016 | Tsubone | B62J 37/00 |
| | | | | 180/219 |
| 2017/0089303 | A1* | 3/2017 | Kurata | F02M 25/0872 |
| 2018/0179992 | A1* | 6/2018 | Morita | F02M 25/089 |

FOREIGN PATENT DOCUMENTS

| | | |
|---|---|---|
| JP | 2009-209914 | 9/2009 |
| JP | 2013-67275 | 4/2013 |
| WO | 2018/015898 | 1/2018 |

\* cited by examiner

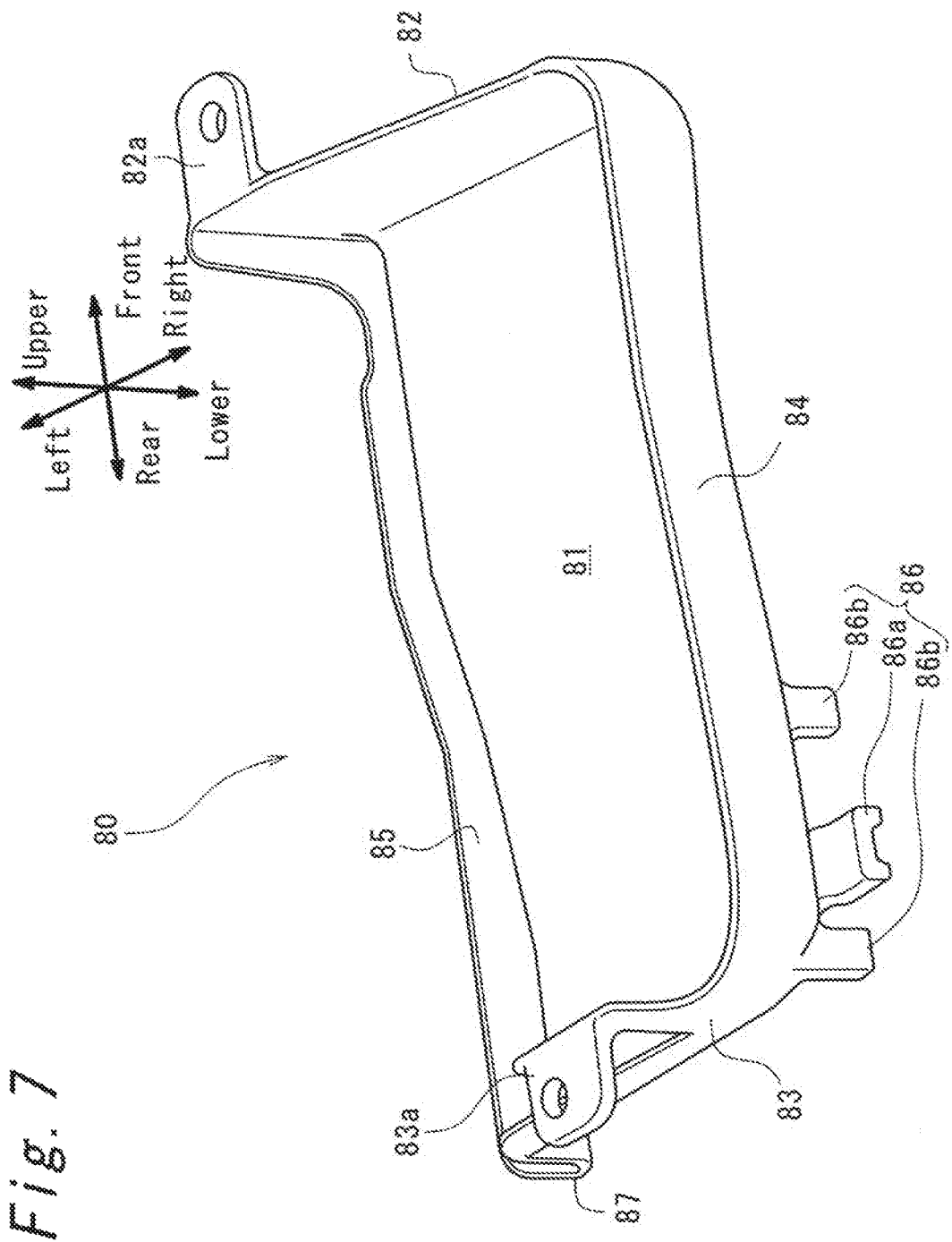

SADDLE-RIDING TYPE VEHICLE

CROSS-REFERENCE TO RELATED APPLICATIONS

This application claims priority of Japanese Patent Application No.: 2018-207565 filed on Nov. 2, 2018, the content of which is incorporated herein by reference.

BACKGROUND OF THE INVENTION

Field of the Invention

The present invention relates to a saddle-riding type vehicle.

Description of the Related Art

A saddle-riding type vehicle including a canister configured to adsorb and hold fuel vapors resulting from evaporation of fuel stored in a fuel tank is known. Conventionally, in such a saddle-riding type vehicle, the canister is disposed under a driver's seat or between a side cowling and a frame. Further, JP 2009-209914 A discloses a structure of a motorcycle in which a canister is inserted into a fuel tank through an opening hole formed on a lower surface of the fuel tank.

SUMMARY OF THE INVENTION

The structure disclosed in JP 2009-209914 A needs to have a seal structure between the lower surface of the fuel tank and the canister, and thus tends to make a structure of the fuel tank complicated and bring about an increase in cost.

It is an object of the present invention to provide a saddle-riding type vehicle that achieves high mountability of a canister while suppressing an increase in cost.

In order to solve the above problems, the present invention is implemented as follows.

A saddle-riding type vehicle according to the present invention includes a driver's seat on which an occupant taking a driving posture sits, a fuel tank disposed in front of the driver's seat and extending in a front-rear direction, and a canister formed into a long-length shape that defines a longitudinal direction of the canister, fuel vapors generated in the fuel tank being brought into the canister and adsorbed and held by an adsorbent provided in the canister. The canister is disposed under the fuel tank with the longitudinal direction aligned with the front-rear direction and is entirely covered by the fuel tank in vehicle side view.

According to the present invention, since the canister extends in the front-rear direction along the fuel tank, a dimension in an up-down direction of the canister becomes small, and the canister can be easily disposed under the fuel tank. This reduces an amount of raising of a bottom portion of the fuel tank upward for mounting the canister, which facilitates molding of the bottom portion of the fuel tank. As a result, a manufacturing cost of the fuel tank can be reduced.

Further, since the canister can be disposed in the vicinity of the fuel tank, a canister pipe connecting the fuel tank and the canister can be made shorter. This makes it possible to reduce the cost of the canister pipe that tends to be high due to requirements of oil resistance and heat resistance.

Furthermore, since the canister is covered by the fuel tank in vehicle side view, the canister can be protected by the fuel tank without an additional member. This makes it possible to increase the mountability of the canister while suppressing an increase in cost.

According to the present invention, the following configuration can be provided in addition to the above configuration.

(a) The fuel tank includes a raised portion formed on a center of the fuel tank in a vehicle width direction, the raised portion resulting from raising a bottom portion of the fuel tank upward and extending in the front-rear direction, a vehicle body frame extending under the raised portion in the front-rear direction, an upper surface of the raised portion being gradually getting lower toward a rear of the raised portion, and the canister is disposed close to a front side of the fuel tank.

(b) The fuel tank includes, in a middle portion of the fuel tank in the front-rear direction, a bulging portion bulging outward in a vehicle width direction and is getting smaller in dimension in the vehicle width direction from the bulging portion toward both sides of the fuel tank in the front-rear direction, and in plan view, at least a part of the canister is disposed in the bulging portion.

(c) The canister includes a fuel vapor inlet and a fuel vapor outlet on an end surface of the canister in the longitudinal direction.

(d) The saddle-riding type vehicle further includes a purge valve configured to regulate flow of the fuel vapors from the canister to an internal combustion engine, the purge valve being disposed adjacent to the canister in the front-rear direction and under the fuel tank.

(e) The canister includes an open-air port through which liquefied fuel resulting from liquefying the fuel vapors held by the adsorbent is released to atmosphere, and further includes a catch tray configured to guide the liquefied fuel released through the open-air port to a discharge position set on the vehicle.

(f) In addition to the configuration (e), the catch tray includes a pipe support portion configured to support at least one of pipes connected to the canister.

(g) The canister is fastened by an elastic band to a bracket attached to a bottom portion of the fuel tank.

(h) The saddle-riding type vehicle further includes a head pipe configured to support a steering stem to allow the steering stem to turn, a vehicle body frame extending from the head pipe in the front-rear direction, and a side stand provided on one side in the vehicle width direction and configured to support a vehicle body leaning to the one side in the vehicle width direction during parking. The fuel tank is formed into a saddle shape astride the vehicle body frame, the canister and a fuel pump are disposed on one side and the other side of the fuel tank, respectively, with the vehicle body frame interposed between the canister and the fuel pump, and the fuel pump is disposed adjacent to a side of the vehicle body frame where the side stand is located.

According to the configuration (a), the canister can be easily disposed so as to overlap the raised portion in vehicle side view. This allows, even with a raised bottom portion resulting from raising the bottom portion of the fuel tank upward for disposing the canister formed, fuel to easily flow to the other side in the vehicle width direction of the fuel tank across the raised portion in the rear portion of the fuel tank and be guided to the fuel pump while suppressing the influence of the raised bottom portion.

According to the configuration (b), the canister can be easily disposed so as to overlap the fuel tank in plan view.

According to the configuration (c), pipes connected to the fuel vapor inlet and the fuel vapor outlet of the canister can be easily laid in the front-rear direction along the fuel tank. This allows the pipes to be easily laid in the bottom portion of the fuel tank while inhibiting the pipes from being exposed from the fuel tank to the outside in the vehicle width direction in plan view. Further, since it is not necessary to lay the pipes between the canister and the fuel tank in the up-down direction, the amount of raising of the bottom portion of the fuel tank can be reduced.

According to the configuration (d), since the purge valve is disposed in the vicinity of the canister, a canister outlet pipe connecting the canister and the purge valve is made shorter. This makes it possible to reduce the cost of the canister outlet pipe that tends to be high due to requirements of oil resistance, heat resistance, and the like. Furthermore, the purge valve can be protected by the fuel tank without an additional member.

According to the configuration (e), since fuel vapors escaping from the canister can be guided to a preset discharge position on the vehicle regardless of a position where the canister is disposed, it is possible to increase a degree of freedom in position where the canister is disposed.

According to the configuration (f), at least one pipe can be supported by the catch tray without an additional member.

According to the configuration (g), the canister can be elastically supported adjacent to the lower side of the fuel tank while avoiding coming into contact with the fuel tank.

According to the configuration (h), in a parked state where the vehicle body leaning to a side in the vehicle width direction is supported by the side stand, the fuel pump is positioned on the leaning side in the vehicle width direction. This makes it easy to, even with the fuel tank formed into a saddle shape, guide the fuel toward the fuel pump in the parked state.

The saddle-riding type vehicle according to the present invention can achieve high mountability of the canister while suppressing an increase in cost.

BRIEF DESCRIPTION OF THE DRAWINGS

The foregoing and the other features of the present invention will become apparent from the following description and drawings of an illustrative embodiment of the invention in which:

FIG. 7 is a perspective view only showing a catch tray.

DETAILED DESCRIPTION OF THE INVENTION

Figure 1:
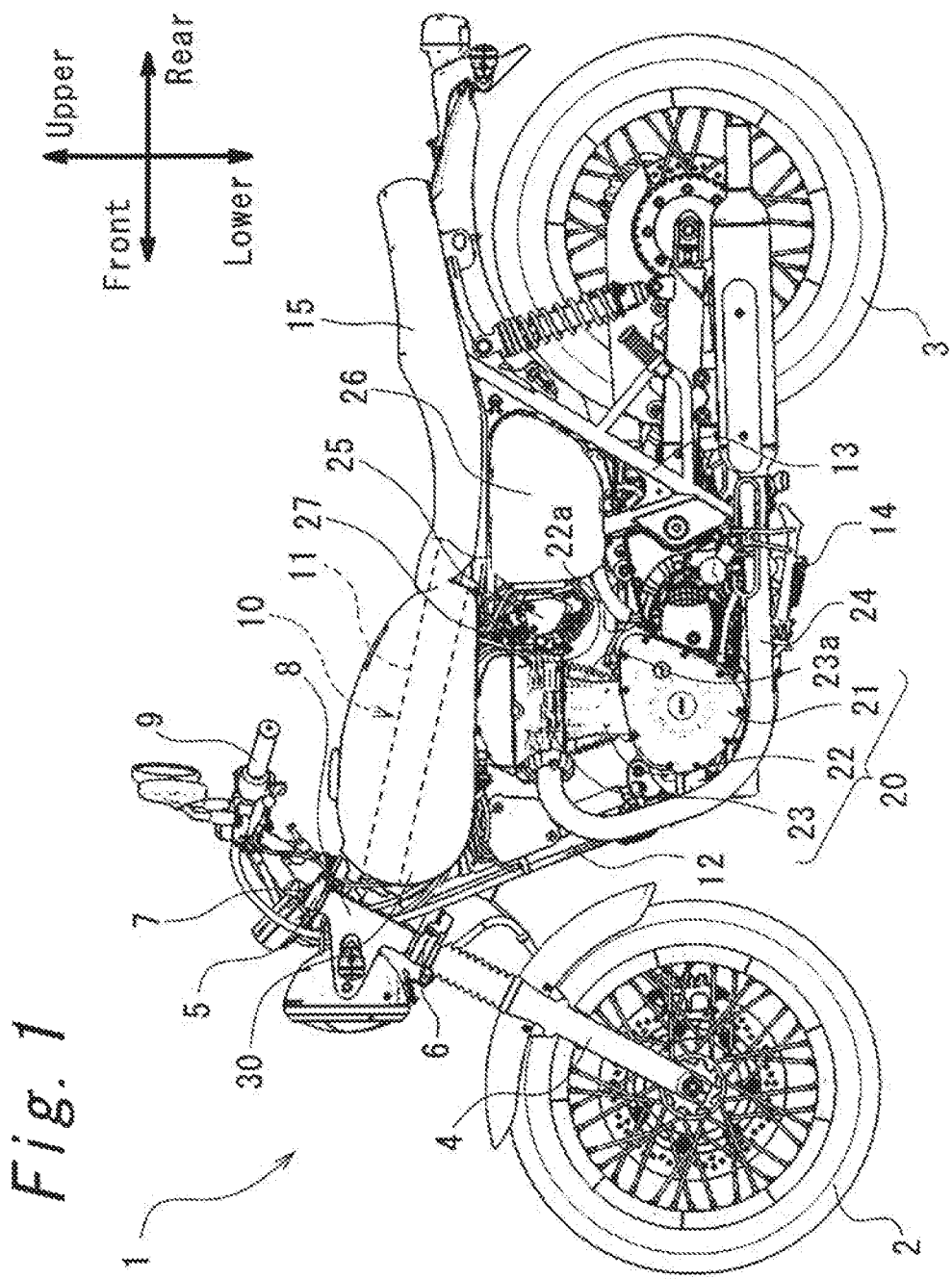
FIG. 1 is a left side view of a motorcycle according to an embodiment of the present invention.

FIG. 1 is a left side view of a motorcycle 1 (a saddle-riding type vehicle) according to an embodiment of the present invention. The definition of directions used in the present embodiment coincides with the definition of directions as viewed from a driver who gets on the motorcycle 1.

Overall Structure of Motorcycle

As shown in FIG. 1, the motorcycle 1 includes a front wheel 2 and a rear wheel 3. The front wheel 2 is rotatably supported at a lower portion of a front fork 4 extending approximately in an up-down direction. The front fork 4 is supported by a steering stem 7 via an upper bracket 5 provided at an upper end of the front fork 4 and an under bracket 6 provided below the upper bracket 5. The steering stem 7 is turnably supported by a head pipe 8.

To the upper bracket 5 is attached a handlebar 9 extending leftward and rightward. A driver's swing operation on the handlebar 9 left and right turns the front wheel 2 about the steering stem 7.

A vehicle body frame 10 includes an upper frame member 11 extending rearward from the head pipe 8, a lower frame member 12 extending downward from the head pipe 8 and having a lower end extending rearward, and a rear frame member 13 connecting a rear end of the upper frame member 11 and a rear end of the lower frame member 12.

An engine 20 is mounted in a space enclosed by the vehicle body frame 10. Specifically, the engine 20 is enclosed by the upper frame member 11, the lower frame member 12, and the rear frame member 13. The engine 20 includes a crankcase 21, a cylinder 22 and a cylinder head 23 in that order from the bottom. An exhaust pipe 24 is connected to an exhaust port located on a front surface of the cylinder head. A throttle body 25 is connected, via an intake pipe 27, to an intake port located on a rear surface of the cylinder head 23. An intake box 26 is connected to a rear side of the throttle body 25.

On a rear side of the upper frame member 11 is provided a driver's seat 15 astride which an occupant takes a driving posture. A fuel tank 30 is disposed in front of the driver's seat 15. At a lower portion of the lower frame member 12 is provided a side stand 14. During parking, the side stand 14 supports the motorcycle 1 with the motorcycle 1 leaning to the left. The fuel tank 30 is located above the engine 20.

Herein, the motorcycle 1 is designed as a naked motorcycle without a cowling, and an external side of the engine 20 is exposed to the outside of the vehicle body. Specifically, side surfaces of the engine 20 in a vehicle width direction and the exhaust pipe 24 are exposed to the outside in the vehicle width direction. That is, in side view, the side surfaces of the engine 20 in a vehicle width direction and the exhaust pipe 24 are visible. Air around the engine 20 is replaced with a traveling wind, thereby preventing an increase in temperature around the engine 20. The engine 20 has fins 22a, 23a for heat dissipation formed on the cylinder 22 and the cylinder head 23, respectively. The engine 20 is designed as an air-cooled engine that is cooled by the traveling wind and dissipates heat through the fins 22a, 23a.

Figure 2:
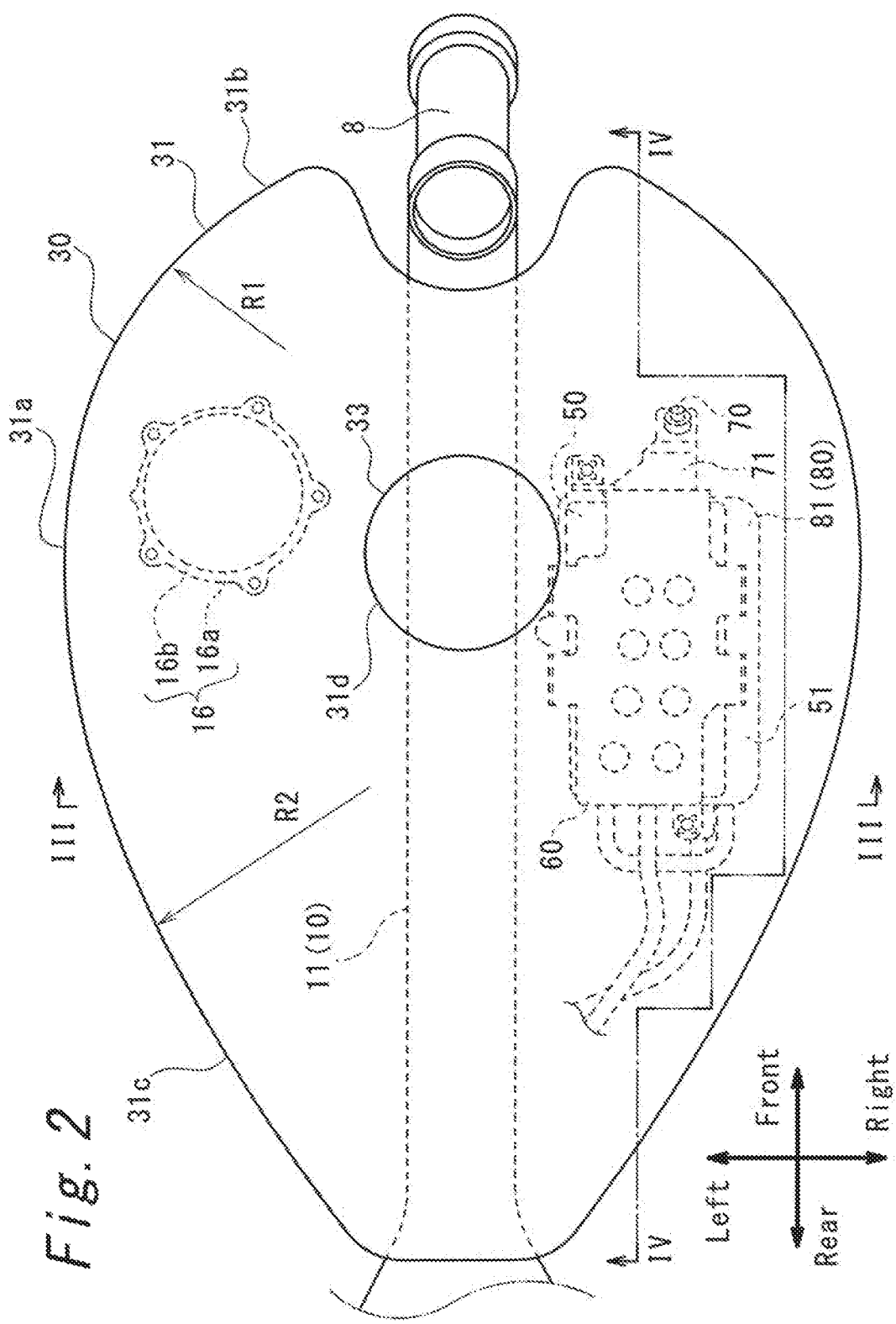
FIG. 2 is an enlarged plan view showing a fuel tank and surroundings of the fuel tank.
Figure 3:
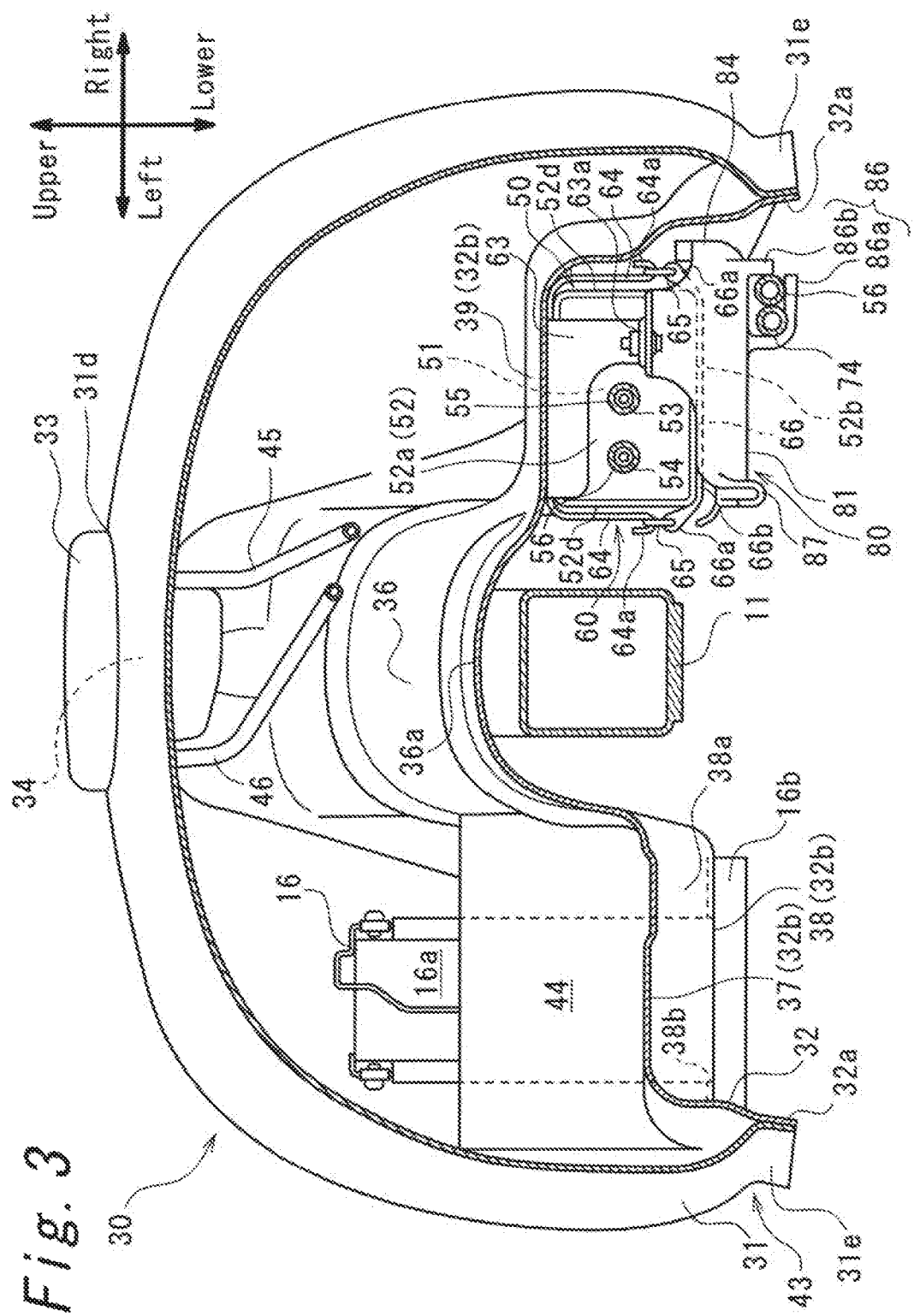
FIG. 3 is a cross-sectional view taken along line III-III in FIG. 2.

FIG. 2 is an enlarged plan view showing the fuel tank 30 and surroundings of the fuel tank 30, and FIG. 3 shows a cross section taken along line III-III in FIG. 2 and orthogonal to a front-rear direction. As shown in FIG. 2 and FIG. 3, a canister 50 is provided on a right side of a bottom portion of the fuel tank 30, that is, adjacent to one side of the upper frame member 11, and a fuel pump 16 is provided on a left side, that is, adjacent to the other side of the upper frame member 11. Accordingly, the fuel pump 16 and the canister 50 are arranged, separately from each other and compactly, adjacent to the left and right sides of the upper frame member 11 on the bottom portion of the fuel tank 30. The fuel pump 16 and the canister 50 are located above engine 20.

Fuel Tank

As shown in FIG. 2, the fuel tank 30 is formed bilaterally symmetrical in plan view of the vehicle body. A center of the fuel tank 30 in the vehicle width direction coincides with a center of the vehicle body in the vehicle width direction. The upper frame member 11 is located in a space along the center of the fuel tank 30 in the vehicle width direction and under the fuel tank 30. The fuel tank 30 has a long and narrow shape and has its longitudinal direction extending in the front-rear direction. According to the present embodiment, the longitudinal direction of the fuel tank 30 extends along the upper frame member 11.

As shown in FIG. 3, the fuel tank 30 includes a tank outer plate 31 that is made of metal, extends in the front-rear direction, and bulges upward relative to the upper frame member 11, and a tank bottom plate 32 that is made of metal and closes a lower opening of the tank outer plate 31, the tank outer plate 31 and the tank bottom plate 32 being welded to each other along their respective peripheries.

As shown in FIG. 2, the tank outer plate 31 includes an outer plate bulging portion 31a that is located in the middle of the tank outer plate 31 in the front-rear direction and contains a portion of the tank outer plate 31 having the largest dimension in the vehicle width direction, and an outer plate front portion 31b and an outer plate rear portion 31c that are curved inward in the vehicle width direction on front and rear sides of the tank outer plate 31. The outer plate bulging portion 31a bulges outward in a left-right direction relative to the outer plate front portion 31b and the outer plate rear portion 31c. The tank outer plate 31 is formed into a teardrop shape in which a dimension in the left-right direction decreases from the outer plate bulging portion 31a toward both the sides of the tank outer plate 31 in the front-rear direction. Specifically, the outer plate bulging portion 31a is located on the front side of the fuel tank 30. Accordingly, the outer plate front portion 31b is sharply curved inward in the vehicle width direction as compared with the outer plate rear portion 31c, and a curvature radius R1 of the outer plate front portion 31b is smaller than a curvature radius R2 of the outer plate rear portion 31c.

Figure 4:
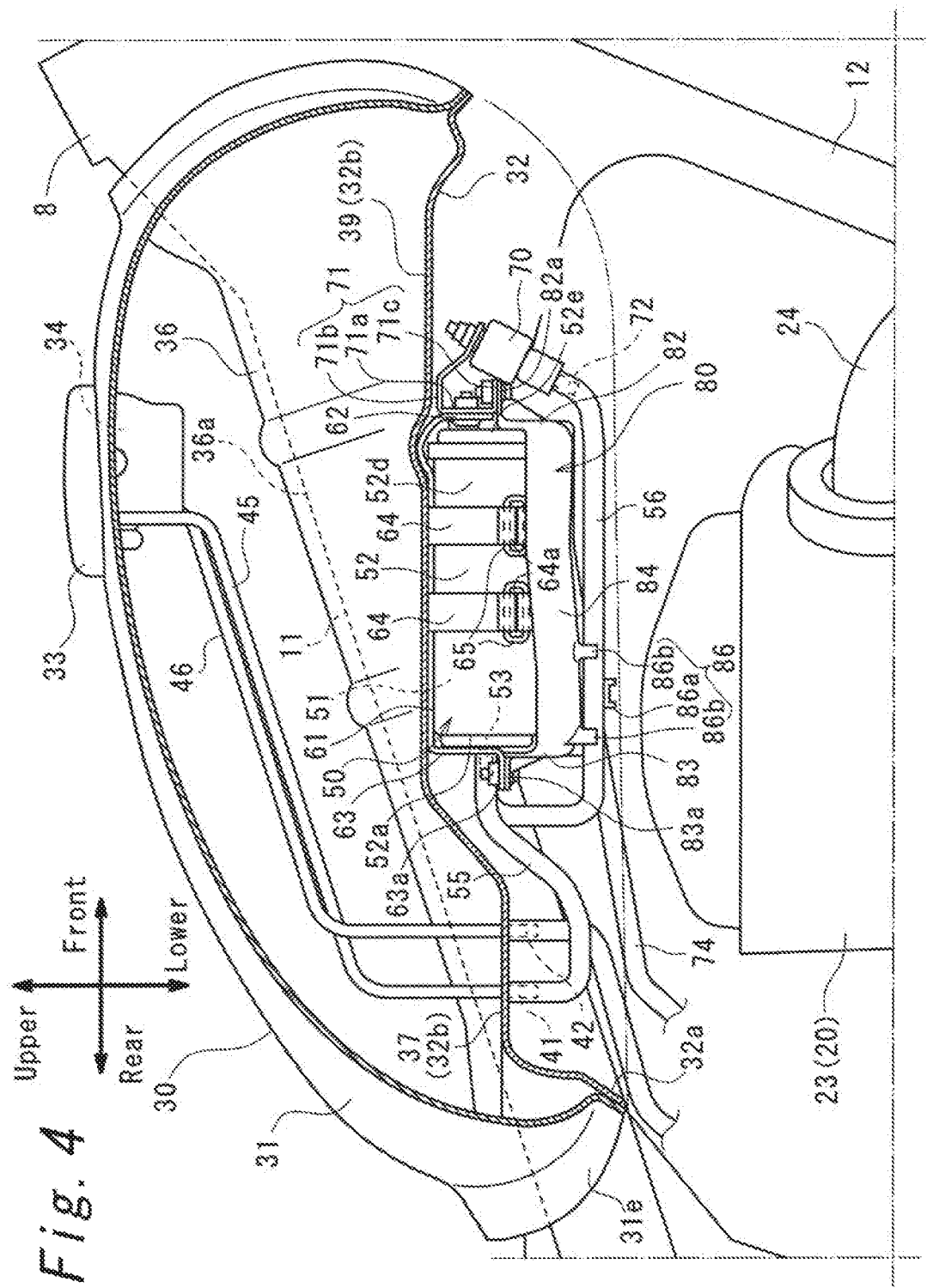
FIG. 4 is a cross-sectional view taken along line IV-IV in FIG. 2.

As shown in FIG. 3, the tank outer plate 31 is formed into an approximately U shape opened downward as its cross-sectional shape orthogonal to the front-rear direction. On a lower end portion of the tank outer plate 31 is formed an outer plate peripheral edge portion 31e extending centered on a vertical axis, that is, extending on a whole of a peripheral edge portion of the tank outer plate 31. FIG. 4 is a cross-sectional view of a right side of the fuel tank 30 taken along line Iv-Iv in FIG. 2 and orthogonal to the vehicle width direction. As shown in FIG. 4, the outer plate peripheral edge portion 31e extends horizontally or approximately horizontally in side view of the vehicle body.

As shown in FIG. 3, a fuel filler port 31d is formed at a top of the tank outer plate 31. A tank cap 33 is detachably attached to the fuel filler port 31d. The fuel filler port 31d is located at the top of the fuel tank 30. Around the fuel filler port 31d is provided a vapor phase part 34 that holds fuel vapors resulting from evaporation of fuel stored in the fuel tank 30.

As shown in FIG. 3, the tank bottom plate 32 is formed into an approximately U shape opened downward as its cross-sectional shape orthogonal to the front-rear direction. The tank bottom plate 32 includes a bottom plate peripheral edge portion 32a extending centered on the vertical axis, that is, extending on a whole of a peripheral edge portion of the tank bottom plate 32, and a bottom wall portion 32b that extends inward from a top of the bottom plate peripheral edge portion 32a and vertically divides an inside of the bottom plate peripheral edge portion 32a.

The bottom wall portion 32b has a raised portion 36 raised upward relative to remaining portions along a center of the bottom wall portion 32b in the vehicle width direction. The fuel tank 30 lies astride the upper frame member 11 along the raised portion 36 and covers an upper surface and side surfaces of the upper frame member 11. In other words, the upper frame member 11 extends under the raised portion 36 in the front-rear direction. As shown in FIG. 4, the raised portion 36 extends in the front-rear direction across the fuel tank 30.

As shown in FIG. 3 and FIG. 4, on the bottom wall portion 32b are formed a pair of left and right non-mounting surface portions 37 that are located adjacent to both sides of the raised portion 36 and extend approximately horizontally on the rear side of the fuel tank 30, a pump mounting surface portion 38 that is located adjacent to a left side of the raised portion 36 and in front of a corresponding one of the non-mounting surface portions 37 and is lowered via a falling surface 38a relative to the non-mounting surface portion 37, and a canister mounting surface portion 39 that is located adjacent to a right side of the raised portion 36 and in front of a corresponding one of the non-mounting surface portions 37 and is raised via a rising surface 39a (see FIG. 5) relative to the non-mounting surface portion 37.

Figure 5:
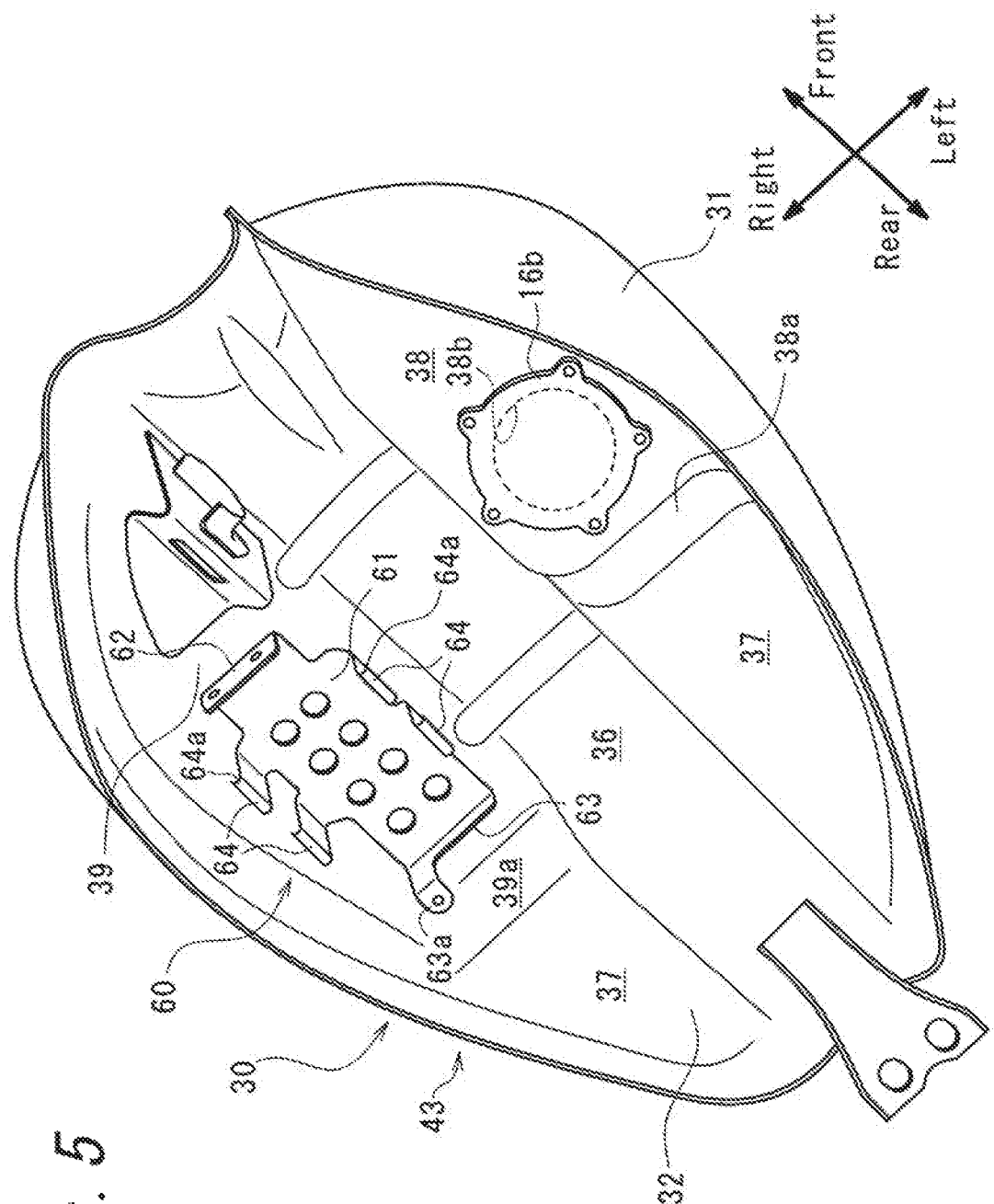
FIG. 5 is a perspective view of the fuel tank as viewed from below.

FIG. 5 is a perspective view of the fuel tank 30 as viewed from below, showing both the fuel pump 16 and a canister bracket 60 to be described later. As shown in FIG. 5, the non-mounting surface portion 37 adjacent to the right side of the raised portion 36 is shorter in the front-rear direction than the non-mounting surface portion 37 adjacent to the left side of the raised portion 36. In other words, a rear end of the canister mounting surface portion 39 is located more rearward than a rear end of the pump mounting surface portion 38, and thus the canister mounting surface portion 39 is longer in the front-rear direction than the pump mounting surface portion 38. The tank bottom plate 32 is raised stepwise in the order of the pump mounting surface portion 38, the non-mounting surface portions 37, and the canister mounting surface portion 39. The non-mounting surface portions 37, the pump mounting surface portion 38, and the canister mounting surface portion 39 are lower than an upper surface 36a of the raised portion 36 in side view.

As shown in FIG. 3, the raised portion 36 is formed into an inverted U-shape opened downward as its cross-sectional shape orthogonal to the front-rear direction. As shown in FIG. 4, the raised portion 36 extends in the front-rear direction along the upper frame member 11 obliquely downward such that the upper surface 36a is gradually getting lower toward a rear portion of the raised portion 36. Accordingly, an amount of the raised portion 36 raised with respect to the remaining portions is increased toward the front portion.

The outer plate peripheral edge portion 31e of the tank outer plate 31 and the bottom plate peripheral edge portion 32a of the tank bottom plate 32 are welded. Accordingly, a sealed fuel storage space of the fuel tank 30 is formed between the tank outer plate 31 and the tank bottom plate 32. The bottom plate peripheral edge portion 32a and the outer plate peripheral edge portion 31e of the tank outer plate 31 located outside of the tank forms a tank side portion 43 having a volume portion for containing fuel therebetween. A lower end of the tank side portion 43, that is, a joint between the bottom plate peripheral edge portion 32a and the outer plate peripheral edge portion 31e is lower than the non-mounting surface portions 37, the pump mounting surface portion 38, and the canister mounting surface portion 39.

As shown in FIG. 4, a tank-side fuel vapor outlet 41 and a tank-side water outlet 42 are provided on the right non-mounting surface portion 37. The tank-side fuel vapor outlet 41 and the tank-side water outlet 42 are each formed of a nipple extending through the non-mounting surface portion 37 in the up-down direction and protruding downward. In other words, the tank-side fuel vapor outlet 41 and the tank-side water outlet 42 are provided behind the canister 50. In the fuel tank 30, a tank-side fuel vapor discharge pipe 45 connecting the vapor phase part 34 and the tank-side fuel vapor outlet 41 to cause the vapor phase part 34 and the tank-side fuel vapor outlet 41 to communicate with each other, and a tank-side water discharge pipe 46 connecting the fuel filler port 31d and the tank-side water outlet 42 to cause the fuel filler port 31d and the tank-side water outlet 42 to communicate with each other are laid. Through the tank-side water discharge pipe 46, liquid around the fuel filler port 31d (for example, fuel that has fallen from the fuel filler port 31d, water that has entered from between the tank cap 33 and the fuel tank 30, and the like) is discharged downward of the fuel tank 30.

As shown in FIG. 3 and FIG. 5, a pump opening 38b extending in the up-down direction through the pump mounting surface portion 38 is formed. Further, a baffle plate 44 is provided behind the pump opening 38b. The baffle plate 44 is provided continuously with the falling surface 38a, extends in the up-down direction with a predetermined width in the left-right direction, and divides, in the front-rear direction, a space of the fuel tank 30 adjacent to the left side of the raised portion 36.

Fuel Pump

As shown in FIG. 3, the fuel pump 16 includes a pump body 16a having a cylindrical shape extending in the up-down direction, and a flange portion 16b provided at a lower end portion of the pump body 16a. With reference also to FIG. 5, the pump body 16a of the fuel pump 16 is inserted into the pump opening 38b from below, and the flange portion 16b is fastened to the pump mounting surface portion 38 from below.

As described above, the baffle plate 44 is provided behind the pump opening 38b. The baffle plate 44 allows fuel moved forward in the fuel tank 30 during braking to be easily held in the front side of the baffle plate 44, and easily suppresses backward movement of fuel held around the fuel pump 16 during acceleration. Accordingly, the baffle plate 44 allows the fuel held in the fuel tank 30 to easily stay on the pump mounting surface portion 38.

As described above, since the pump mounting surface portion 38 is located lower than the non-mounting surface portions 37 and the canister mounting surface portion 39, the fuel tends to gather on the pump mounting surface portion 38. Accordingly, the fuel pump 16 is mounted on the pump mounting surface portion 38 that is provided on the lower-most surface of the fuel tank 30 and where the fuel is easily accumulated, allowing the fuel to be efficiently brought in.

Canister

As shown in FIG. 3 and FIG. 4, the canister 50 includes a canister case 52 that is made from resin and includes an adsorbent 51 that adsorbs fuel vapors resulting from evaporation of fuel in the fuel tank 30. The canister case 52 is formed into a long-length shape that defines its longitudinal direction, and is supported on a lower side of the canister mounting surface portion 39 of the tank bottom plate 32 via the canister bracket 60 with the longitudinal direction aligned with the front-rear direction. The canister 50 is formed into a rectangular shape as its cross-sectional shape orthogonal to the front-rear direction that is shorter in the up-down direction than in the left-right direction and extends in the front-rear direction with an approximately uniform cross section.

On a rear end surface 52a of the canister case 52 are provided a canister inlet 53 through which fuel vapors are brought into the canister 50 from the fuel tank 30 and a canister outlet 54 through which fuel vapors are discharged from the canister 50. The canister inlet 53 and the canister outlet 54 are each formed of a nipple extending rearward through the rear end surface 52a in the front-rear direction. As shown in FIG. 4, the canister inlet 53 is connected to the tank-side fuel vapor outlet 41 via a canister inlet pipe 55 to allow fuel vapors generated in the fuel tank 30 to be brought into the canister 50. The canister inlet pipe 55 is formed of a hose having oil resistance and heat resistance.

A purge valve 70 is provided in front of the canister 50 to regulate flow of fuel vapors from the canister 50 to the engine 20. The purge valve 70 is fixed to the canister bracket 60 via a valve bracket 71.

The valve bracket 71 is formed into a U shape opened forward in side view as its cross sectional shape and includes a base portion 71a extending in the up-down direction and attached to the canister bracket 60, an upper surface portion 71b bent at an upper edge portion of the base portion 71a and extending forward, and a lower surface portion 71c bent at a lower edge portion of the base portion 71a and extending forward. The purge valve 70 is fastened to the upper surface portion 71b from below. A catch tray 80 to be described later is fastened to the lower surface portion 71c.

Figure 6:
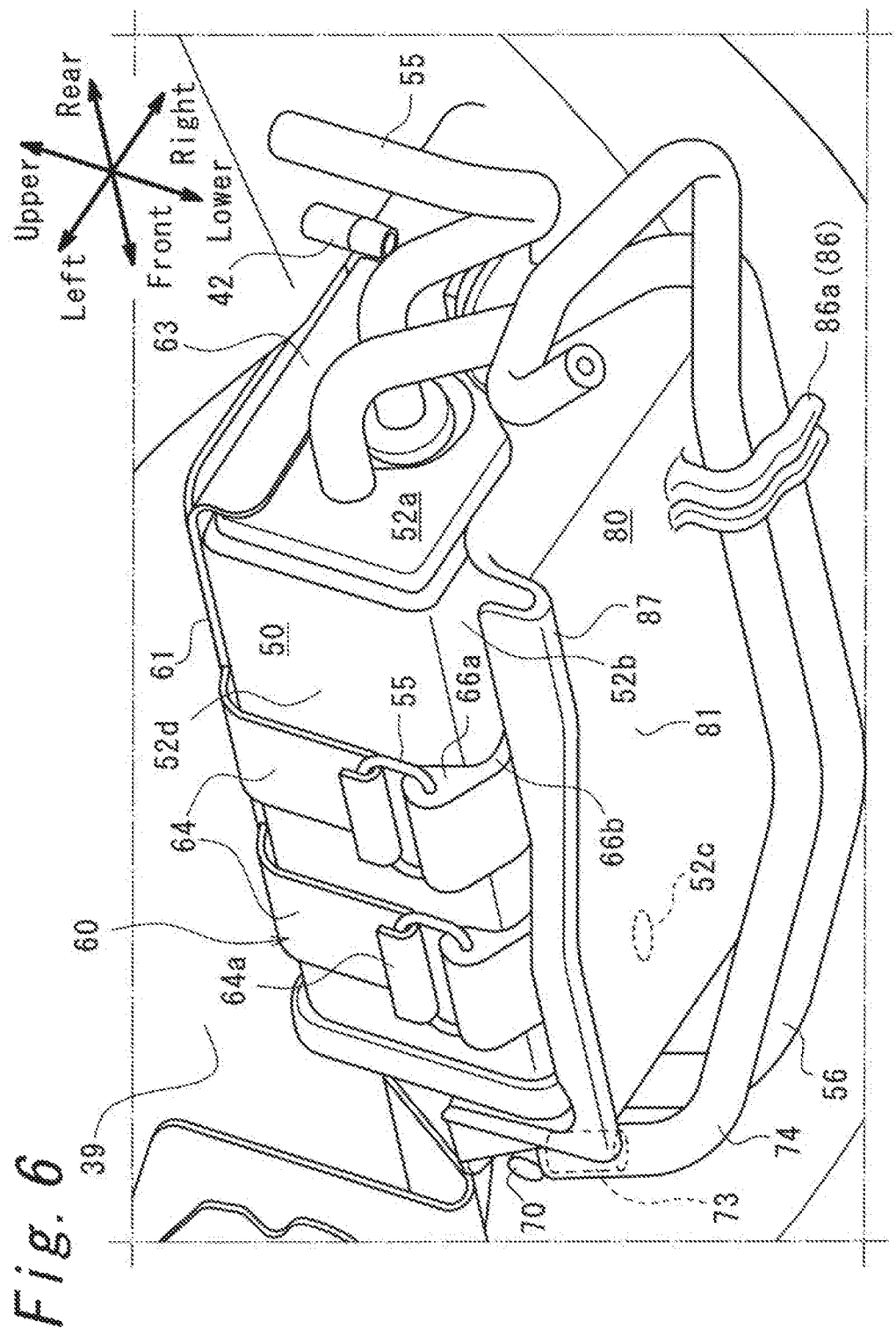
FIG. 6 is a perspective view of a canister and surroundings of the canister as viewed from below.

FIG. 6 is a perspective view of the canister 50 and surroundings of the canister 50 as viewed from below. With reference also to FIG. 6, the purge valve 70 includes a valve inlet 72 (see FIG. 4) and a valve outlet 73 (see FIG. 6) that protrude obliquely rearward and downward. The valve inlet 72 and the valve outlet 73 are each formed of a nipple. The purge valve 70 is formed as a solenoid valve whose communication between the valve inlet 72 and the valve outlet 73 is regulated by a controller (not shown).

The valve inlet 72 is connected to the canister outlet 54 via a canister outlet pipe 56 to allow fuel vapors held in the canister case 52 to be brought into the valve inlet 72. The valve outlet 73 is connected to the intake pipe 27 (see FIG. 1) located downstream of the throttle body 25 via a purge pipe 74. The canister outlet pipe 56 and the purge pipe 74 extend in the front-rear direction and are arranged side by side with each other in the vehicle width direction under the canister 50.

Accordingly, when a negative pressure is generated in the intake pipe 27 while the engine 20 is running, the control device opens the purge valve 70 to cause the valve inlet 72 and the valve outlet 73 to communicate with each other. As a result, fuel vapors discharged from the fuel tank 30 and adsorbed in the canister 50 are drawn through the intake pipe 27 via the purge valve 70 into a combustion chamber of the engine 20 and then burned, which inhibits the fuel vapors from being released to the atmosphere.

As shown in FIG. 6, an open-air port 52c is formed extending through a bottom surface 52b of the canister case 52 in the up-down direction. Through the open-air port 52c, liquefied fuel out of fuel vapors held in the canister case 52 is discharged to the outside when an amount of the liquefied fuel exceeds a predetermined amount. The open-air port 52c is provided at a position above a rear side of the cylinder head 23 and behind the exhaust pipe 24, that is, at a position away from immediately above the exhaust pipe 24 in a vehicle-mounted state.

Under the canister case 52, the catch tray 80 is provided facing the open-air port 52c of the canister case 52 and receives fuel escaping and dripping from the open-air port 52c.

Canister Bracket

As shown in FIG. 5, the canister bracket 60 includes a base portion 61 having a rectangular shape in plan view and fixed to the canister mounting surface portion 39 of the tank bottom plate 32, a front surface portion 62 bent at a front edge portion of the base portion 61 and extending downward, a rear surface portion 63 bent at a rear edge portion of the base portion 61 and extending downward, and a pair of left and right side surface portions 64 bent at left and right edge portions of the base portion 61 and extending downward.

The base portion 71a of the valve bracket 71 is fastened to the front surface portion 62 from the front. The rear surface portion 63 includes a rear extending portion 63a bent at a lower end portion of the rear surface portion 63 and extending rearward. The catch tray 80 is fastened to the rear extending portion 63a from below. The pair of left and right side surface portions 64 are each formed of a pair of front and rear portions and have hook portions 64a resulting from bending their respective lower end portions outward into a U-shape.

As shown in FIG. 3, elastic bands 66 are attached to the hook portions 64a via rings 65. Specifically, each of the elastic bands 66 includes a pair of connecting portions 66a that are provided at both end portions thereof and attached to the left and right hook portions 64a via the rings 65, and a left-right extending portion 66b extending between the connecting portions 66a in a longitudinal direction of the elastic band 66 and connecting the connecting portions 66a. The elastic bands 66 elastically support the bottom surface 52b of the canister 50 upward from below with the left-right extending portion 66b. Accordingly, the canister 50 is fastened by the elastic bands 66 to the lower side of the canister mounting surface portion 39 with the base portion 61 interposed between the lower side of the canister mounting surface portion 39 and the canister 50.

As shown in FIG. 3, the left and right surface portions 64 of the canister bracket 60 face side surface portions 52d of the canister 50 with a slight gap with respect to the canister 50 fastened to the canister bracket 60. Further, as shown in FIG. 4, the front surface portion 62 of the canister bracket 60 faces the front end surface 52e with a slight gap, and the rear surface portion 63 of the canister bracket 60 faces the rear end surface 52a with a slight gap. Accordingly, the canister 50 is positioned relative to the canister bracket 60 in the front-rear direction and the left-right direction. Therefore, the front surface portion 62, the rear surface portion 63, and the side surface portions 64 of the canister bracket 60 also serve as positioning wall portions used for positioning the front and rear position and the left and right position of the canister 50.

Catch Tray

FIG. 7 is a perspective view of the catch tray 80 as viewed from above. The catch tray 80 is made from resin and is formed in a box shape opened upward. The catch tray 80 includes a bottom surface portion 81 horizontally extending under the canister 50, a front surface portion 82 extending upward from a front edge portion of the bottom surface portion 81, a rear surface portion 83 extending upward from a rear edge portion of the bottom surface portion 81, a right side surface portion 84 extending upward from a right edge portion of the bottom surface portion 81, and a left side surface portion 85 extending upward from a left edge portion of the bottom surface portion 81.

The bottom surface portion 81 is formed into a rectangular shape longer in the front-rear direction. The catch tray 80 has a height in the up-down direction less than a width in the left-right direction and has a length in the front-rear direction greater than the width in the left-right direction.

As shown in FIG. 2, the bottom surface portion 81 is located facing at least the whole of the lower side of the canister 50 and is one size larger than that of the canister 50. As shown in FIG. 4, the front surface portion 82 and the rear surface portion 83 are located facing the canister 50 in the front-rear direction. Further, the right side surface portion 84 is located facing the right side of the canister 50.

With reference also to FIG. 6, a pipe support portion 86 that supports the canister outlet pipe 56 and the purge pipe 74 is integrally formed on a rear right side of the bottom surface portion 81 and protrudes downward. The pipe support portion 86 includes an L-shaped restricting portion 86a formed into an L-shape in rear view, and a pair of side restricting portions 86b (see FIG. 4) located apart from each other in front of and behind the L-shaped restricting portion 86a and extending downward from the bottom surface portion 81.

The canister outlet pipe 56 and the purge pipe 74 are located in the up-down direction between the bottom surface portion 81 and a portion of the L-shaped restricting portion 86a extending in the left-right direction and located in the left-right direction between a portion of the L-shaped restricting portion 86a extending in the up-down direction and the side restricting portions 86b. Accordingly, the respective positions of the canister outlet pipe 56 and the purge pipe 74 are restricted in the up-down direction and the left-right direction by the bottom surface portion 81 and the pipe support portion 86 below the canister 50.

At a left end portion of the front surface portion 82 is integrally formed a front extending portion 82a extending forward from an upper edge portion of the front surface portion 82. At a right end portion of the rear surface portion 83 is integrally formed a rear extending portion 83a extending rearward from an upper end portion of the rear surface portion 83. The catch tray 80 is, from below, fastened to the lower surface portion 71c of the valve bracket 71 and the rear extending portion 63a of the canister bracket 60 via the front extending portion 82a and the rear extending portion 83a provided diagonally opposite to each other. Therefore, the catch tray 80 can be attached using the canister bracket 60 and the valve bracket 71 without an additional member.

As shown in FIG. 6, on a left side portion of the bottom surface portion 81 is integrally formed a groove portion 87 that has a groove shape recessed downward and extends in the front-rear direction. The groove portion 87 is formed into a U-shape opened upward, extending along the bottom surface portion 81 in the front-rear direction. The groove portion 87 extends obliquely rearward and downward and has a rear end portion located above the rear side of the engine 20 and behind the exhaust pipe 24, that is, away from immediately above the exhaust pipe 24 in the front-rear direction.

Note that, in vehicle side view shown in FIG. 4, the canister 50, the canister inlet pipe 55, the canister outlet pipe

56, the purge valve 70, at least a front half of the purge pipe 74, the canister bracket 60, the valve bracket 71, and the catch tray 80 are all located higher than the lower edge portion of the tank side portion 43 (indicated by a long dashed double-dotted line in FIG. 4). In other words, all components related to the canister 50 are covered by the fuel tank 30 (tank side portion 43) from both the sides.

Fuel Vapor Generated in Fuel Tank

Fuel vapors generated in the fuel tank 30 first accumulates in the vapor phase part 34 located at the top of the fuel tank 30. Then, the fuel vapors are discharged out of the fuel tank 30 from the vapor phase part 34 through the tank-side fuel vapor discharge pipe 45 and the tank-side fuel vapor outlet 41. The fuel vapors discharged from the fuel tank 30 are brought into the canister inlet 53 of the canister 50 through the canister inlet pipe 55.

The fuel vapors brought into the canister 50 through the canister inlet 53 are adsorbed by the adsorbent 51 and held in the canister 50. The purge valve 70 is opened under the control of the control device (not shown) in a state where the engine 20 is running and the intake pipe 27 has a negative pressure. As a result, the fuel vapors adsorbed and held in the canister 50 are brought into the valve inlet 72 of the purge valve 70 through the canister outlet pipe 56 and discharged from the valve outlet 73, and then brought into the intake pipe 27 through the purge pipe 74.

The fuel vapors brought into the intake pipe 27 are drawn into the combustion chamber through the intake port of the engine 20 and then burned. This prevents the fuel vapors generated in the fuel tank 30 from being released to the atmosphere.

Further, when liquefied fuel out of the fuel vapors held in the canister 50 is accumulated, and the amount of the liquefied fuel exceeds the predetermined amount, the liquefied fuel escapes downward through the open-air port 52*c* formed on the bottom surface 52*b* of the canister 50. The fuel escaping from the canister 50 drips onto the bottom surface portion 81 of the catch tray 80 located under the canister 50. Then, the fuel after reaching the groove portion 87 is guided rearward along the groove portion 87 and finally drips downward from the rear end surface of the groove portion 87.

The rear end surface of the groove portion 87 is located above the rear side of the engine 20 and behind the exhaust pipe 24, that is, away from immediately above the exhaust pipe 24, thereby preventing dripping fuel from adhering to the exhaust pipe 24.

The saddle-riding type vehicle described above can exhibit the following effects.

(1) Since the canister 50 extends in the front-rear direction along the fuel tank 30, the dimension in the up-down direction of the canister 50 becomes small, and the canister 50 can be easily disposed under the fuel tank 30. This reduces the amount of raising of the tank bottom plate 32 upward for mounting the canister 50, which facilitates molding of the tank bottom plate 32. As a result, a manufacturing cost of the fuel tank 30 can be reduced.

Further, since the canister 50 can be disposed in the vicinity of the fuel tank 30, the canister inlet pipe 55 connecting the fuel tank 30 and the canister 50 can be made shorter. This makes it possible to reduce the cost of the canister inlet pipe 55 that tends to be high due to requirements of oil resistance and heat resistance.

Furthermore, since the canister 50 is covered by the fuel tank 30 in vehicle side view, the canister 50 can be protected by the fuel tank 30 without an additional member. This makes it possible to increase the mountability of the canister 50 while suppressing an increase in cost. Further, this eliminates the need of providing an additional design part for covering the canister from the sides, and thus makes it possible to reduce the number of parts.

Note that the canister 50 is formed into a rectangular shape as its cross-sectional shape orthogonal to the front-rear direction that is larger in the vehicle width direction than in the up-down direction. Furthermore, an inner side surface in the vehicle width direction of the canister 50 protrudes toward the raised portion 36 outside the canister mounting surface portion 39. This reduces the amount of raising of the canister mounting surface portion 39 of the tank bottom plate 32 upward for securing a mount space for the canister 50, so that it is easily suppress a reduction in tank capacity of the fuel tank 30 due to the fact that the canister 50 is mounted under the fuel tank 30.

(2) In vehicle side view, the canister 50 is disposed lower than the upper surface 36*a* of the raised portion 36, but entirely overlapping the raised portion 36. In other words, the canister 50 is disposed overlapping a portion of the raised portion 36 that is greater in width in the up-down direction than the canister 50. This allows, even with the canister mounting surface portion 39 resulting from raising the tank bottom plate 32 upward for disposing the canister 50 formed, fuel to easily flow to the other side in the vehicle width direction of the fuel tank 30 across the raised portion 36 in the rear portion of the fuel tank 30 and be guided to the fuel pump 16 while suppressing the influence of the canister mounting surface portion 39.

(3) Since at least a part of the canister 50 is located in the outer plate bulging portion 31*a* of the fuel tank 30 in plan view, the canister 50 can be easily disposed so as to overlap the fuel tank 30.

(4) Since the canister inlet 53 and the canister outlet 54 are provided on the rear end surface 52*a* of the canister 50, the canister inlet pipe 55 and the canister outlet pipe 56 connected to the inlet 53 and the outlet 54 can be easily laid along the fuel tank 30 in the front-rear direction. This allows the canister inlet pipe 55 and the canister outlet pipe 56 to be easily laid in the bottom portion of the fuel tank 30 while inhibiting the canister inlet pipe 55 and the canister outlet pipe 56 from being exposed from the fuel tank 30 to the outside in the vehicle width direction in plan view. Further, since it is not necessary to lay the canister inlet pipe 55 and the canister outlet pipe 56 between the canister 50 and the fuel tank 30 in the up-down direction, the amount of raising of the tank bottom plate 32 can be reduced.

(5) Since the purge valve 70 is disposed adjacent to the front side of the canister 50, and the purge valve 70 and the canister 50 can be arranged in the vicinity of each other, the canister outlet pipe 56 connecting the canister 50 and the purge valve 70 is made shorter. This makes it possible to reduce the cost of the canister outlet pipe 56 that tends to be high due to requirements of oil resistance, heat resistance, and the like. Furthermore, since the purge valve 70 is located above the lower edge of the tank side portion 43, the purge valve 70 can be protected by the fuel tank 30 without an additional member.

(6) Since the fuel escaping from the canister 50 through the open-air port 52*c* can be received by the catch tray 80 and guided to a preset discharge position on the vehicle through the groove portion 87 regardless of a position where the canister 50 is disposed, it is possible to increase a degree of freedom in position where the canister 50 is disposed. That is, providing the catch tray 80 makes it possible to set a dripping position to a position different from the position where the canister 50 is attached even when fuel escapes from the canister 50, which in turn makes it possible to prevent the fuel from dripping onto a portion that spoils the appearance.

(7) Since the pipe support portion 86 is provided on the catch tray 80, the canister outlet pipe 56 and the purge pipe 74 can be supported on the catch tray 80 without an additional member.

(8) The canister 50 is supported by the elastic bands 66 with the canister bracket 60 attached to the tank bottom plate 32, so that the canister 50 can be elastically supported adjacent to the lower side of the fuel tank 30 while avoiding coming into contact with the fuel tank 30.

(9) The fuel pump 16 is disposed adjacent to the left side of the raised portion 36 in the fuel tank 30. While the motorcycle 1 is parked, the side stand 14 supports the vehicle body leaning to the left. Accordingly, while the motorcycle 1 is parked in a state in which the vehicle body leaning to the left is supported by the side stand 14, the fuel pump 16 is positioned on a leaning side in the vehicle width direction. This makes it easy to, even with the fuel tank 30 formed into a saddle shape, guide the fuel toward the fuel pump 16 while the motorcycle 1 is parked.

(10) Since the purge valve 70 is disposed in front of the canister 50, it is easy to dispose the purge valve 70 lower than the upper surface 36a of the raised portion 36 obliquely extending rearward and downward as compared with when the purge valve 70 is disposed behind the canister 50. Further, since it is not necessary to form a space for disposing the purge valve 70 behind the canister 50 on the tank bottom plate 32, it is easy to bring the fuel into the fuel pump 16 while suppressing the raising of the tank bottom plate 32 behind the canister 50.

(11) Since the canister 50 is covered by the catch tray 80 from below, the canister 50 is less noticeable in appearance. This suppresses degradation of vehicle appearance due to the fact that the canister 50 is mounted.

(12) Since the catch tray 80 is disposed to cover the lower surface of the canister 50, the canister 50 is received by the catch tray 80 even when the canister 50 fastened by the elastic bands 66 is unfastened, preventing the canister 50 from falling off. Accordingly, the catch tray 80 also serves to prevent the canister 50 from falling off.

(13) In vehicle side view, the canister 50, the canister inlet pipe 55, the canister outlet pipe 56, the purge valve 70, at least the front half of the purge pipe 74, the canister bracket 60, the valve bracket 71, and the catch tray 80 are all located higher than the lower edge portion of the tank side portion 43. Accordingly, since the components are covered by the tank side portion 43 from the sides, the components are less noticeable in appearance, suppressing degradation of appearance, and can be protected by the tank side portion 43 without an additional component.

(14) The motorcycle 1 is a naked motorcycle and has no cowling covering the engine 20. This makes it easy to bring traveling air to an area around the canister 50. This in turn makes it possible to suppress an increase in temperature of the canister 50.

(15) In the fuel tank 30, the canister mounting surface portion 39 is located higher than the non-mounting surface portions 37 of the bottom wall portion 32b of the tank bottom plate 32. This makes it easy to prevent the lower end of the canister 50 from being exposed downward from the lower end of the fuel tank 30. Further, the pump mounting surface portion 38 is located lower than the canister mounting surface portion 39. This makes it possible to suppress a decrease in possible fuel fill quantity when the canister 50 is disposed under the fuel tank 30.

(16) The canister 50 has a rectangular upper surface and extends in parallel to the canister mounting surface portion 39 of the tank bottom plate 32. This makes it easily to make the gap between the upper surface of the canister 50 and the canister mounting surface portion 39 small over the entire surface.

(17) The canister 50 is disposed in a portion of the tank outer plate 31 having the largest width in the vehicle width direction. This makes it easy to dispose the canister 50 close to the outside in the vehicle width direction. Similarly, since the canister 50 is disposed in a portion of the tank outer plate 31 having the largest curvature radius, it is easy to make the gap between the canister 50 and the tank outer plate 31 in the vehicle width direction small with the canister 50 disposed in the vicinity of the tank outer plate 31.

(18) The canister 50 is disposed such that its longitudinal direction is aligned with the front-rear direction. This makes it possible to decrease a spinning amount of the tank bottom plate 32 (a difference in dimension in the up-down direction between the bottom plate peripheral edge portion 32a and the bottom plate portion 32b), and thus makes it possible to easily form the fuel tank 30.

Fixing the canister 50 and the canister bracket 60 for the purge valve 70 to the tank bottom plate 32 of the fuel tank 30 makes it possible to simplify the structure as compared with a case where the bracket extends from the upper frame member 11 and makes the appearance better.

The description has been given of the above embodiment with reference to an example where the purge valve 70 is disposed in front of the canister 50, but the present invention is not limited to this example. That is, the purge valve 70 may be disposed behind the canister 50. In this case, it is not necessary to lay the canister outlet pipe 56 across the canister 50 in the front-rear direction, and thus it is possible to make the canister outlet pipe 56 shorter, which in turn makes it possible to reduce the cost of the canister outlet pipe 56.

Further, the description has been given of the above embodiment with reference to an example where the canister inlet 53 and the canister outlet 54 are provided on the rear end surface 52a of the canister 50, but the present invention is not limited to this example. That is, the canister inlet 53 and the canister outlet 54 may be provided on the front end surface of the canister 50.

Further, the description has been given of the above embodiment with reference to an example where the canister 50 is fastened to the canister bracket 60 with the elastic bands 66, but the present invention is not limited to this example. That is, any method may be employed as a method for fixing the canister 50, and, for example, the canister 50 may be fastened to the fuel tank or may be supported by the catch tray 80.

Further, the description has been given of the above embodiment with reference to an example where the pump body 16a of the fuel pump 16 is inserted into the fuel tank 30 from below, but the invention is not limited to this example. That is, the pump body 16a may be provided outside the fuel tank 30, and in this case as well, the fuel pump 16 is disposed on a side opposite to a side where the canister 50 is disposed with the raised portion 36 interposed between the fuel pump 16 and the canister 50.

Further, the description has been given of the above embodiment with reference to an example where the fuel pump 16 is disposed adjacent to the left side of the upper frame member 11, and the canister 50 is disposed adjacent to the right side of the upper frame member 11, but the present invention is not limited to this example. That is, the canister 50 may be disposed adjacent to the left side of the upper frame member 11, and the fuel pump 16 may be disposed adjacent to the right side of the upper frame member 11.

Further, the description has been given of the above embodiment with reference to the naked motorcycle as an example, the present invention is not limited to this example. That is, the present invention is also applicable to saddle-riding type vehicles provided with a full cowling or a half cowling, such as of a racer type, motocross type, American type, and cruiser type.

Further, the description has been given of the above embodiment with reference to an example where the upper frame member 11 is disposed under the fuel tank 30, the present invention is not limited to this example. That is, the present invention is also applicable to a saddle-riding type vehicle having a frame in which the upper frame member 11 does not extend under the fuel tank.

Note that the present invention is not limited to the embodiment described above, and various modifications and changes can be made without departing from the spirit and scope of the present invention as defined in the claims.

What is claimed is:

1. A saddle-riding type vehicle comprising:
    a driver's seat on which an occupant taking a driving posture sits;
    a fuel tank disposed in front of the driver's seat and extending in a front-rear direction and having a fuel vapor outlet at a bottom of the fuel tank;
    a canister formed into an elongated shape that defines a longitudinal axis of the canister, fuel vapors generated in the fuel tank being brought into the canister and adsorbed and held by an adsorbent provided in the canister; and
    a fuel vapor discharge pipe extending through the fuel tank and connecting a vapor phase part of the fuel tank to the fuel vapor outlet,
    wherein a bottom portion of the fuel tank includes a raised portion extending along a longitudinal axis of the vehicle at a center of the fuel tank with respect to a vehicle width, the raised portion being configured to extend above an axially-extending portion of a vehicle body frame extending along the longitudinal axis of the vehicle,
    wherein the canister is disposed under the bottom portion of the fuel tank with the longitudinal axis of the canister aligned with the front-rear direction and is entirely covered by the fuel tank in a vehicle side view, and
    wherein the canister is lower than an upper surface of the raised portion in the vehicle side view, has a length entirely overlapped by a length of the raised portion, and is lower than an upper surface of the axially-extending portion of the vehicle body frame where the canister is located.

2. The saddle-riding type vehicle according to claim 1, wherein:
    the upper surface of the raised portion gradually lowers toward a rear of the raised portion, and
    the canister is disposed close to a front side of the fuel tank.

3. The saddle-riding type vehicle according to claim 1, wherein
    the fuel tank includes a bulging portion in a middle portion of the fuel tank in the front-rear direction, the bulging portion bulging outward in a vehicle width direction and getting smaller in the vehicle width direction from the bulging portion toward both sides of the fuel tank in the front-rear direction, and
    in plan view, at least a part of the canister is disposed in the bulging portion.

4. The saddle-riding type vehicle according to claim 1, wherein the canister includes a fuel vapor inlet and the fuel vapor outlet on an end surface of the canister with respect to the longitudinal axis.

5. The saddle-riding type vehicle according to claim 1, further comprising a purge valve configured to regulate flow of the fuel vapors from the canister to an internal combustion engine, the purge valve being disposed adjacent to the canister in the front-rear direction and under the fuel tank.

6. The saddle-riding type vehicle according to claim 1, wherein the canister includes an open-air port through which liquefied fuel resulting from liquefying the fuel vapors held by the adsorbent is released to atmosphere, the canister further including a catch tray configured to guide the liquefied fuel released through the open-air port to a discharge position set on the vehicle.

7. The saddle-riding type vehicle according to claim 6, wherein the catch tray includes a pipe support portion configured to support at least one of pipes connected to the canister.

8. The saddle-riding type vehicle according to claim 1, wherein the canister is fastened by an elastic band to a bracket attached to a bottom portion of the fuel tank.

9. The saddle-riding type vehicle according to claim 1, further comprising:
    a head pipe configured to support a steering stem to allow the steering stem to turn;
    a vehicle body frame extending from the head pipe in the front-rear direction; and
    a side stand provided on a first side in the vehicle width direction and configured to support a vehicle body leaning to the first side in the vehicle width direction during parking,
    wherein the fuel tank is formed into a saddle shape astride the vehicle body frame,
    wherein the canister and a fuel pump are disposed at opposite sides of the fuel tank, respectively, with the vehicle body frame interposed between the canister and the fuel pump, and
    wherein the fuel pump is disposed adjacent to the first side of the vehicle body frame where the side stand is located.

10. The saddle-riding type vehicle according to claim 1, wherein the fuel tank includes a tank bottom plate forming the bottom of the fuel tank, and both the fuel vapor outlet and the canister are provided on the tank bottom plate so as to align in the front-rear direction.

11. The saddle-riding type vehicle according to claim 10, wherein the fuel vapor outlet is a nipple penetrating the bottom of the fuel tank in an up-down direction and extending downwardly.

12. The saddle-riding type vehicle according to claim 1, further comprising:
    a head pipe configured to support a steering stem to allow the steering stem to turn; and
    a vehicle body frame extending from the head pipe in the front-rear direction,
    wherein the fuel tank is has a saddle shape astride the vehicle body frame, and wherein the canister and a fuel pump are disposed at opposite sides of the fuel tank, respectively, with the vehicle body frame interposed between the canister and the fuel pump.

13. A saddle-riding type vehicle comprising:
a fuel tank including a tank outer plate made of metal and a tank bottom plate made of metal; and
a canister in which fuel vapors generated in the fuel tank are brought and adsorbed and held by an adsorbent provided in the canister,
wherein the tank outer plate has an approximately U-shaped cross-sectional shape orthogonal to the front-rear direction and opened downward,
wherein the tank bottom plate closes a lower opening of the tank outer plate,
wherein the tank outer plate and the tank bottom plate are welded to each other along respective lower peripheries,
wherein the canister is entirely covered by the tank outer plate in the side view of the vehicle,
wherein a bottom portion of the fuel tank includes a raised portion extending along a longitudinal axis of the vehicle at a center of the fuel tank with respect to a vehicle width, the raised portion being configured to extend above an axially-extending portion of a vehicle body frame extending along the longitudinal axis of the vehicle,
wherein the canister is lower than an upper surface of the raised portion in the side view of the vehicle, has a length entirely overlapped by a length of the raised portion, and is lower than an upper surface of the axially-extending portion of the vehicle body frame where the canister is located.

14. The saddle-riding type vehicle according to claim 13, wherein the canister is located in a position with respect to a vehicle front-rear direction corresponding to a position with respect to the vehicle front-rear direction of a largest width portion of the tank outer plate.

15. The saddle-riding type vehicle according to claim 14, wherein the canister is located in a position with respect to the vehicle front-rear direction corresponding to a largest curvature radius portion of the tank outer plate.

16. The saddle-riding type vehicle according to claim 13, wherein the canister is disposed below the tank bottom plate and above a lower end of the tank outer plate.

* * * * *